Patented Jan. 15, 1935

1,988,356

UNITED STATES PATENT OFFICE 1,988,356

ARTIFICIAL MASS AND PROCESS OF MAKING SAME

Herbert Hönel, Klosterneuburg-Weidling, near Vienna, Austria, assignor to Beck, Koller & Company, Inc., Detroit, Mich., a corporation of Delaware No Drawing. Original application January 2, 1931, Serial No. 506,296. Divided and this application December 20, 1932, Serial No. 648,138. In Austria August 6, 1927

13 Claims. (Cl. 260—4)

The invention relates to a process for producing organic masses of more or less high molecular weight, which may be employed alone or in combination with filling materials as the basis of pressed articles, as binding agents or for preparing varnishes and other coating or impregnating agents and the like.

The present application is a division of my prior application Serial No. 506,296, filed January 2, 1931, which latter application is a division of an earlier application Serial No. 362,460, filed May 11, 1929, now Patent No. 1,800,296, which in turn is a continuation in part of my application Serial No. 218,587, filed Sept. 9, 1927, now Patent No. 1,800,295.

The process consists in heating condensation products of low molecular weight, obtained with the aid of alkaline contact agents from such phenolic substances, which possess only two particularly reactive positions in the molecule and which, when heated alone change into an infusible condition, to elevated temperatures together with any ester-like' chemical substances. The reaction is accompanied with the formation of water and is to be regarded as a condensation reaction.

As the particularly reactive positions in a phenol are to be regarded, as is known, the two ortho and the para positions to the phenol-hydroxyl. One of these positions must therefore be occupied by a substituent. Examples of the latter are, a hydrocarbon radical (alkyl, aryl, aralkyl, hydroaromatic radical) or an oxalkyl radical or chlorine. Other substitutents have proved to be less suitable. One or both of the meta positions may on occasion also be occupied. The following are examples of a few easily obtainable phenolic bodies of this kind: o- and p-cresol, certain xylenols, carvacrol, thymol, p-tertiary butyl phenol and amyl phenol, p-benzyl phenol, as well as the corresponding derivatives of m-cresol, guaiacol, o- and p-chlorophenol, o- and p-chloro-m-cresol, etc.

Derivatives of the dioxybenzenes, i.e. divalent mononuclear phenolic substances, are also suitable; the conditions, however, are somewhat more complicated and not quite clear. As, moreover, the use of these substances is lacking in economy they will not be further discussed.

On the other hand, the applicability of all those divalent, di-nuclear phenolic substances, which are derivatives of the pp-di-oxy-di-phenylmethane, is to be emphasized. They are easily obtainable and result from the condensation of 2 mols of phenols or certain homologues with 1 mol of a carbonyl compound with the aid of hydrochloric acid, or, if possible, other acids. In the present case the most suitable phenol homologue is o-cresol, from which di-o-cresylol methane, ethane, propane or butane, is obtained according to whether condensation has been effected with formaldehyde and its homologues or acetone and its homologues. Cyclic ketones may also be employed, in which case, for example, di-o-cresylol cyclohexane or di-o-cresylol methyl-cyclohexane corresponding to the above compounds, are obtained. Phenol, however, may also be used as starting material, and, for example, 2 atoms of chlorine be introduced as substituents, in the di-phenylol compounds thus obtained. In all these cases di-nuclear di-valent phenolic substances are obtained, all of which also only possess two reactive positions in the molecule.

It is to be observed that condensation products from phenolic substances with only one reactive position in the molecule may also be employed. The product resulting from the reaction of such substances with the neutral ester-like bodies is rather poor in quality, which is in agreement with the fact that, when heated alone, they cannot be converted into the infusible state. Phenols of this kind are, for example, certain xylenols, pseudo-cumenol, creosol, chlor-o-cresol and chlor-p-cresol.

$\alpha$- and $\beta$-naphthol behave in a surprising manner like the last mentioned phenols, although they actually belong to the first mentioned group.

My invention more particularly consists in that where a substantially neutral ester-like body is reacted with a condensation product of the heat hardening type and of low molecular weight obtained by alkaline condensation from an excess of formaldehyde and a phenolic body, which phenolic body has only two unsubstituted particularly reactive positions, a smooth reaction mass may be obtained, as contrasted with a lumpy mass containing insoluble and infusible particles, such as would result where condensation products of the heat hardening type are employed, derived from phenols having all three particularly reactive positions unsubstituted.

The mechanism of the reaction very probably is that the molecules of the condensation product do not only react with one another leading to the formation of products of very high molecular weight, but also with the ester-like substance or with its components. The alcoholic hydroxyl groups of the condensation product, known as very reactive, may bring about unions so that multivalent ester components may be in part formed. This possibility in conjunction with the first mentioned reaction may lead to the formation of individual gelatinous or rubber-like infusible and insoluble but nevertheless homogeneous masses. Such products are also to be considered as being of infinitely high viscosity. When employing smaller proportions of the condensation product a still soluble end product may be obtained, which, however, also is distinguished by an essentially higher viscosity as compared with the reaction mixture before entering the reaction or with any of the two components.

In general all possible ester-like substances have proved to be applicable to the reaction. Even low molecular completely crystalloid esters, for example benzoic acid esters of monovalent alcohols, yield according to the proportions employed, thin to highly viscous oils or gelatinous masses. Esters of monovalent alcohols with polyvalent components may yield, even with lesser quantities of the same condensation product, gelatinous end products. The full value of the process, however, is only reached when the ester-like susbtance is one which is practically non-volatile. Thus products which have been obtained by esterification of a suitable mixture of both polyvalent and monovalent ester-forming components are very advantageous in this sense. Also such esters are well adapted which are obtained from a polyvalent ester-forming component on the one hand (e. g. a polyhydric alcohol) and a mixture of poly- and monovalent components on the other (e. g. a mixture of poly- and monobasic carboxylic acids).

In order better to understand this the well known fact may be mentioned that the esterification of equivalent proportions of polybasic acids and polyhydric alcohols in most cases finally leads to insoluble and infusible masses. But when a sufficient proportion of a monovalent ester-forming component is employed simultaneously, the ester-like substance obtained is soluble and far from a rubber-like infusible condition. With such esters even small quantities of a condensation product produce the above described effect.

The final end product, obtained according to this process with a suitable proportion of a condensation product, shows very similar external properties to those of a mere ester obtained with a comparatively high proportion of the usually expensive polybasic acids, i. e. it is still soluble but has a high viscosity and a certain rubber-like elasticity. The economic advantage of the process which enables the proportions of ester components to be replaced to a very considerable extent by the usually cheap monobasic acid is thus very evident, the more so as at the same time a considerable saving in polyvalent alcohol is also affected. Furthermore, such products obtained according to this process have been found to be technically superior to merely ester-like products or products otherwise equivalent as to viscosity conditions due to their better waterproofness and generally greater resistance to chemical influences.

It is, moreover, not necessary to start with the individual components of the esters as such; it is also possible to replace the monobasic acids (for example higher fatty acids etc.) wholly or in part by their glycerides (i. e. fat or fatty oil), in which case individual esters are nevertheless obtained apparently owing to re-esterification. Purely physical mixtures of complicated esters of this kind and ordinary fatty acid glycerides, etc., may of course also be subjected together to the reaction with the condensation products. In cases such as these the economic advantage is, of course, still greater.

The monobasic as well as the polybasic acids may be aliphatic, saturated or unsaturated, aromatic or hydroaromatic, they may or may not contain alcoholic or phenolic hydroxyl groups (i. e. they may or may not be oxy acids). Glycerine is the most important example of a polyvalent alcohol; alcohols of higher valency or the only divalent glycol may, however, also be employed.

Finally it should be again emphasized that esters of every kind may be employed for the reaction. The hydroxyl compound may also be a phenol and the acid an inorganic acid. A condition for the success of the reaction is merely that the condensation product, is soluble in the ester-like substance (at least when hot) before a condensation reaction takes place, as otherwise, of course, no mutual reaction can result. This result is obtained by suitably choosing the substituents in the phenolic substance. It may in some cases be convenient for instance if the ester-like compound is per se a resin-like substance of high melting point to carry out the process in the presence of a suitable solvent; the latter may, if required, be removed by distillation when the reaction is over.

The preparation of the condensation products is effected in known manner, preferably by leaving the phenolic substance or a mixture of several phenols and aqueous formaldehyde together, with at least so much alkali hydroxide, that a clear solution results, if necessary with the aid of alcohol, to react for a long time at room temperature or slightly elevated temperature. The resulting reaction product is then precipitated with acid-reacting agents. Formaldehyde in excess of the equimolecular quantity is to be employed for successfully carrying out the further reaction with the esterlike products.

This reaction may be effected in different ways. The quantity of condensation product employed may be such that, if the condensation reaction with the ester were carried to completion an insoluble, rubber-like product would result, in which case the reaction must be interrupted before completion, if necessary even in its initial stage. In this case the solutions of the resulting products yield coatings, which become particularly hard at furnace temperatures. If necessary, driers may also be added to the reaction product. Products of this kind resulting from an interrupted reaction are also particularly suitable for use as plastic masses. They may be employed with or without filling materials for the preparation of various commodities.

An alternative procedure is to employ the condensation product in such a quantity that even on complete condensation with the ester-like product a viscous or resin-like occasionally a wax-like end product is obtained, which more or less approaches the rubber-like condition without actually attaining it. An increase in the colloidal condition, such as in viscosity, is at least effected. In the case of solid, resin-like esters, an increase of their melting point is, as a rule, effected as well. The heating of the product can in this case be carried to about 200–220° C. for any desired time without any noteworthy further increase of the colloidal condition being observed. The still soluble products or their solutions may be employed alone as the basis for paints or, in general, as raw materials for the production of varnishes and other coating masses. If the acid components or one of these components is derived from drying or semi-drying oils, a drier may also be added, and in this way tough and hard drying varnishes may be obtained.

The claims of the present application are specifically directed to the production of substances resulting from the use of phenols substituted in at least one of the particularly reactive positions by chlorine, and accordingly the following examples, given by way of illustration rather than by way of limitation, are likewise directed to this feature.

Example 1

100 grms. of succinic acid, 150 grms. of lactic acid (100%) and 120 grms. of glycerine (98%) are heated to 160–200° C. until a soft resin-like product with an acid number of about 25 is obtained. At about 100–120° C. the crystalline condensation product obtained from 30 grms. of p-chlorophenol and 35 grms. of 30% formaldehyde is introduced and soon goes into solution. The temperature is gradually raised to 220° C. A soft resin having rubber-like elastic properties which is completely soluble in acetone and alcohol-benzene mixtures is obtained.

Example 2

A condensation product resulting from 55 grms. of p-chlor-m-cresol and 55 grms. of formaldehyde (40% by volume) is added with heating to the fairly hard and brittle resin-like esterification product prepared as in Example 1 from 100 grms. of succinic acid, 160 grms. of salicylic acid and 100 grms. of glycerine and the mixture caused to react by raising the temperature to about 200° C. Without an apparent increase in the melting point of the resin-like product being observed a resin of marked shellac-like properties is obtained. The resin-like condition in this case is without doubt very considerably increased. The product is soluble in acetone and other solvents and may be employed for preparing polishes and the like. Its solutions may further be mixed with both nitrocellulose and with acetylcellulose varnishes. In both cases clear, satisfactorily adhering films are obtained.

Example 3

The thick oily esterification product having an acid number of 30 obtained from 50 grms. of phthalic anhydride, 150 grms. of ricinoleic acid and 50 grms. of mannite, is condensed at 180° C. with the crystalline condensation product obtained from 30 grms. of a mixture of o- and p-chlor-m-cresol and 30 grms. of formaldehyde (40% by volume). The mixture of phenolic substances is obtained by chlorinating the m-cresol dissolved in glacial acetic acid with the calculated quantity of elementary chlorine with ice cooling, and consists mainly of the para compound.

The end product is very soft and elastic-like rubber, it may be diluted to a limited extent with alcohol, in any proportion with benzene hydrocarbons and ester-like solvents, and may be employed as an addition for nitrocellulose varnishes. With the addition of siccatives it yields a hard drying varnish.

Example 4

The soft sticky esterification product obtained from 100 grms. of phthalic anhydride, 100 grms. of methyl cyclohexanol and 30 grms. of glycerine is heated to 140–200° C. together with a condensation product resulting from 50 grms. of di-chlor-diphenylol-propane and 60 grms. of 30% formaldehyde. A resin-like product, somewhat softer than shellac, results, which, like the latter, has rubber-like elastic properties at the temperature of its melting point. It can with advantage be employed as a resin for nitrocellulose varnishes.

In the following claims the expression "soluble artificial masses" is intended to designate bases for coatings of all kinds, particularly varnishes, and bases for impregnating agents, binders and for all sorts of commodities.

The acids and their anhydrides are to be considered as equivalent in forming the esters.

What I claim is:

1. A process of producing clear homogeneous artificial masses suitable as bases for varnish manufacture and similar purposes which comprises reacting together (1) a substantially neutral ester-like body, being practically non-volatile, and (2) a neutralized condensation product obtained with the aid of an alkaline catalyst from formaldehyde in excess of the equimolecular quantity and a phenol having only two unsubstituted particularly reactive positions in the molecule, while the other is substituted by chlorine, the condensation product being capable of undergoing substantial further condensation when heated.

2. A clear homogeneous artificial mass suitable as a base for varnish manufacture and similar purposes comprising the reaction product of (1) a substantially neutral ester-like body, being practically non-volatile, and (2) a neutralized condensation product obtained with the aid of an alkaline catalyst from formaldehyde in excess of the equimolecular quantity and a phenol having only two unsubstituted particularly reactive positions in the molecule, while the other is substituted by chlorine, the condensation product being capable of undergoing substantial further condensation when heated.

3. A soluble artificial mass suitable as a base for varnish manufacture and similar purposes comprising the reaction product of (1) an excess of a substantially neutral ester-like body, being practically non-volatile, and (2) a neutralized condensation product capable of undergoing substantial further condensation when heated, which is obtained with the aid of an alkaline catalyst from formaldehyde in excess of the equimolecular quantity and a phenol having only two unsubstituted particularly reactive positions (o-, o-, p- to the phenolic group) in the molecule while the other is substituted by chlorine, said reaction product being distinguished by its substantially higher viscosity as compared with the ester-like body and the condensation product themselves before having undergone the reaction.

4. A process of producing soluble artificial masses suitable as bases for varnish manufacture and similar purposes, which comprises reacting together (1) an excess of a substantially neutral ester-like body which is practically non-volatile and (2) a neutralized condensation product obtained with the aid of an alkaline catalyst from formaldehyde in excess of the equimolecular quantity and a phenol having not more than two unsubstituted particularly reactive positions in the molecule, while at least one is substituted by chlorine, the condensation product being capable of undergoing substantial further condensation when heated.

5. A soluble artificial mass suitable as a base for varnish manufacture and similar purposes comprising the reaction product of (1) an excess of a substantially neutral ester-like body which is practically non-volatile and (2) a neutralized condensation product obtained with the aid of an alkaline catalyst from formaldehyde in excess of the equimolecular quantity and a phenol having not more than two unsubstituted particularly reactive positions in the molecule, while at least one is substituted by chlorine, the condensation product being capable of undergoing substantial further condensation when heated.

6. A process of producing soluble artificial masses suitable as bases for varnish manufacture and similar purposes which comprises reacting together (1) an excess of an ester-like product obtained from both monobasic and polybasic carboxylic acids on the one hand and a polyhydric alcohol on the other hand with (2) a neutralized condensation product obtained with the aid of an alkaline catalyst from formaldehyde in excess of the equimolecular quantity and a phenol in which only two particularly reactive positions in the molecule are unsubstituted while its other is substituted by chlorine, the condensation product being capable of undergoing substantial further condensation when heated.

7. A soluble artificial mass suitable as a base for varnish manufacture and similar purposes comprising the reaction product of (1) an excess of an ester-like product obtained from both monobasic and polybasic carboxylic acids on the one hand and a polyhydric alcohol on the other hand with (2) a neutralized condensation product obtained with the aid of an alkaline catalyst from formaldehyde in excess of the equimolecular quantity and a phenol in which only two particularly reactive positions in the molecule are unsubstituted while its other is substituted by chlorine, the condensation product being capable of undergoing substantial further condensation when heated.

8. A process of producing soluble artificial masses suitable as bases for varnish manufacture and similar purposes which comprises reacting together (1) an excess of an ester prepared from a polyhydric alcohol and both a monobasic carboxylic acid and succinic acid with (2) a neutralized condensation product obtained with the aid of an alkaline catalyst from formaldehyde in excess of the equimolecular quantity and a phenol in which only two of its particularly reactive positions in the molecule are unsubstituted while its other is substituted by chlorine, the condensation product being capable of undergoing substantial further condensation when heated.

9. A soluble artificial mass suitable as a base for varnish manufacture and similar purposes comprising the reaction product of (1) an excess of an ester prepared from a polyhydric alcohol and both a monobasic carboxylic acid and succinic acid with (2) a neutralized condensation product obtained with the aid of an alkaline catalyst from formaldehyde in excess of the equimolecular quantity and a phenol in which only two of its particularly reactive positions in the molecule are unsubstituted while its other is substituted by chlorine, the condensation product being capable of undergoing substantial further condensation when heated.

10. A process of producing soluble artificial masses suitable as bases for varnish manufacture and similar purposes which comprises reacting together (1) an excess of a mixed glycerine ester of both lactic acid and succinic acid with (2) a neutralized condensation product obtained with the aid of an alkaline catalyst from formaldehyde in excess of the equimolecular quantity and p-chlorphenol, the condensation product being capable of undergoing substantial further condensation when heated.

11. A soluble artificial mass suitable as a base for varnish manufacture and similar purposes comprising the reaction product of (1) an excess of a mixed glycerine ester of both lactic acid and succinic acid with (2) a neutralized condensation product obtained with the aid of an alkaline catalyst from formaldehyde in excess of the equimolecular quantity and p-chlorphenol, the condensation product being capable of undergoing substantial further condensation when heated.

12. A process of producing soluble artificial masses suitable as bases for varnish manufacture and similar purposes which comprises reacting together (1) an excess of a mixed glycerine ester of both succinic and salicylic acid with (2) a neutralized condensation product obtained with the aid of an alkaline catalyst from formaldehyde in excess of the equimolecular quantity and p- chlor-m-cresol, the condensation product being capable of undergoing substantial further condensation when heated.

13. A soluble artificial mass suitable as a base for varnish manufacture and similar purposes comprising the reaction product of (1) an excess of a mixed glycerine ester of both succinic and salicylic acid with (2) a neutralized condensation product obtained with the aid of an alkaline catalyst from formaldehyde in excess of the equimolecular qantity and p-chlor-m-cresol, the condensation product being capable of undergoing substantial further condensation when heated.

HERBERT HÖNEL.